(12) United States Patent
Naffziger et al.

(10) Patent No.: US 9,182,803 B2
(45) Date of Patent: Nov. 10, 2015

(54) LOAD STEP MITIGATION METHOD AND APPARATUS

(75) Inventors: Samuel D. Naffziger, Fort Collins, CO (US); John P. Petry, San Diego, CA (US); Kiran Bondalapati, Los Altos, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 12/958,533

(22) Filed: Dec. 2, 2010

(65) Prior Publication Data

US 2012/0144221 A1  Jun. 7, 2012

(51) Int. Cl.
*G06F 1/32* (2006.01)

(52) U.S. Cl.
CPC ............ *G06F 1/3243* (2013.01); *G06F 1/3203* (2013.01); *Y02B 60/1239* (2013.01)

(58) Field of Classification Search
CPC .............................. G06F 1/3243; G06F 1/3203
USPC ............... 713/300, 340; 324/522; 702/60, 64; 712/28; 714/10
See application file for complete search history.

(56) References Cited

U.S. PATENT DOCUMENTS

| 6,636,976 | B1 * | 10/2003 | Grochowski et al. | ......... 713/320 |
| 7,992,017 | B2 * | 8/2011 | Safford et al. | ................ 713/320 |
| 8,010,824 | B2 | 8/2011 | Naffziger et al. | |
| 2011/0246804 | A1 * | 10/2011 | Kaburlasos et al. | ......... 713/340 |

* cited by examiner

*Primary Examiner* — Stefan Stoynov
(74) *Attorney, Agent, or Firm* — Volpe and Koenig, P.C.

(57) ABSTRACT

A method and apparatus for load step, or instantaneous current spike, mitigation are provided. In the method and apparatus, load steps are mitigated if a computer system a whole is lightly load, which may be determined by the power consumption of the computer system. Further, load steps are mitigated if a number of processor cores capable of inducing a load step is higher than a threshold. The Advanced Configuration and Power Interface (ACPI) performance state of the cores is used to determine a core's potential for generating a load step. A processor core is instructed to mitigate load steps if conditions are met for the mitigation.

20 Claims, 6 Drawing Sheets

LOAD STEP MITIGATION METHOD AND APPARATUS

FIELD OF INVENTION

This application is related to processor technology and, in particular, load step mitigation of instantaneous current spikes.

BACKGROUND

FIG. 1 shows a block diagram of an embodiment of a computer system 100. The computer system 100 includes two processors 110, 120. The processors 110, 120 may be any one of a variety of processors such as a central processing unit (CPU) or a graphics processing unit (GPU). For instance, they may be x86 microprocessors that implement x86 64-bit instruction set architecture and are used in desktops, laptops, servers, and superscalar computers, or they may be Advanced RISC (Reduced Instruction Set Computer) Machines (ARM) processors that are used in mobile phones or digital media players. Other embodiments of the processors are contemplated, such as Digital Signal Processors (DSP) that are particularly useful in the processing and implementation of algorithms related to digital signals, such as voice data and communication signals, and microcontrollers that are useful in consumer applications, such as printers and copy machines. Although the embodiment of FIG. 1 includes two processors for illustrative purposes, any other number of processors will be in-line with the described embodiment.

The processors 110, 120 of FIG. 1 may include one or more processor cores 115A-D, 125A-D that form the computational centers of the processors 110, 120 and are therefore responsible for performing a multitude of computational tasks that enable their respective processors 110, 120 to operate. The processor cores 115A-D, 125A-D may include execution units that perform additions, subtractions, and shifting and rotating of binary digits, among many other computations and may also include address generation and load and store units that perform address calculations for memory addresses and the loading and storing of data from memory. The collection of these operations performed by the processor cores 115A-D, 125A-D drives computer applications to run. In some embodiments, a core 115A may include two execution units and two address generation units. However, other embodiments are contemplated in which a core may only have one execution unit or one address generation unit.

As seen in FIG. 1, the processors 110, 120 are connected to a Northbridge 130 device through a processor bus 128. The Northbridge 130 device is part of the computer chipset, which may reside on a different socket than the processors 110, 120 along with a Southbridge device 150. The Northbridge 130 and the Southbridge 150 are connected via a peripheral bus 152 and are connected to system memory 140 via a memory bus 142. In some embodiments, the Northbridge 130 is referred to as a Memory Controller Hub (MCH) and the Southbridge 150 is referred to an Input/Output (I/O) Controller Hub (ICH). The Northbridge 130 and the Southbridge 150 contain logic that allows the processors 110, 120 to communicate with more hardware components. For instance the Northbridge 130 allows the processors 110, 120 to communicate with system memory 140, whereas the Southbridge allows the processors 110, 120 to communicate with peripherals through a Peripheral Component Interconnect (PCI) slot.

The processors 110, 120 of computer system 100 and their cores 115A-D, 125A-D consume electrical power during their operation. This is due to the fact that the transistors within the processors 110, 120 draw electrical current in their regular operation. Further, faster processors (with fast clock cycles) tend to consume more electrical energy in shorter periods of time than their slower counterparts because they require faster operation of electrical circuitry and therefore more consumption of electrical power. Due to their reliance on external power, processors 110, 120 and their processing cores 115A-D, 125A-D cannot operate under all conditions without performance failures. As an example, one type of Advanced Micro Devices (AMD) Phenom™ processor can operate at 2800 megahertz (MHz) and dissipate 140.8 watts of power, while requiring a voltage range of 1.225 to 1.425 volts and a maximum current draw of 102.5 amperes. Functional failures may occur when a processor operates at power, voltage, or current levels that are outside those for which it is designed. Further, power sources or supplies, such as batteries, are often slow to compensate and adjust their power supply to the needs of the processors.

One problem processor cores 115A-D, 125A-D may encounter in their operation is the di/dt problem. The di/dt problem refers to large changes in current draw or consumption by a processor core (e.g. 115A) over a short interval of time. The name di/dt is derived from the symbol for current, i, the symbol for time, t, and the derivative symbol, d, where di/dt represents the variation in current during an interval of time. These variations may cause oscillations in voltage supply and result in performance and functional failures, such as errors in running computer applications.

FIG. 2 shows an instance of a di/dt spike, or load step, as the problem will be referred to interchangeably herein, which occurs in a processor core (e.g. 115A) starting at the sixth clock cycle and lasting through the eighth clock cycle. The spike is due to a sudden need for current by the circuitry of the processor core. The need for current may be the result of abrupt computations that the core needs to perform, such as an application that suddenly requires a lot of computational effort to run, where the electrical circuitry, including transistors, requires much more current than before the application load. The supply voltage effect of the spike is seen in the corresponding voltage graph, where the current spike results in a voltage dip starting at cycle six. At the eighth cycle the voltage supply is below the operating voltage of the processor core. (Here, the operating voltage of the exemplary processor is 1.225 to 1.425 V). After the di/dt spike, the voltage is restored to a level within the operating voltage range.

In the embodiment of the computer system 100 of FIG. 1, the two processors 110, 120 may be connected in parallel to a voltage supply, where all the processor cores 115A-D, 125A-D share the same voltage supply. The processors 110, 120 may experience a voltage sag, or droop, as a result of a di/dt spike in any one of the processor cores 115A-D, 125A-D. The problem may be exacerbated when two or more processor cores 115A-D, 125A-D experience di/dt spikes at the same time. When di/dt spikes occur at the same time, or are in-phase, voltage droops are constructively compounded to result in a larger droop. However, when di/dt spikes occur in two or more processor cores at different times, or are out-of-phase, then voltage supply waves will propagate across the voltage supply grid. Power supplies are sometimes equipped with capacitance and inductance to limit the voltage fluctuations; however, the fluctuations often occur too fast for the voltage supply to adjust its supply.

Therefore, di/dt spikes by one or more processor cores may cause the power supply of a computer system 100 to become unstable. A computer's digital circuitry and logic may not operate properly under all conditions and computational failures will result in the event that operating conditions are violated. These computational failures will result in application and computer program errors that are experienced by a computer user. In extreme cases, terminal failures to the processor cores may occur that will damage the processors and cores.

Accordingly, it is desirable to have a method and apparatus to mitigate the di/dt problem. It is also desirable to have a method and apparatus to mitigate the di/dt problem while not having a significant impact on a computer system's performance.

SUMMARY OF EMBODIMENTS

Embodiments include a method and apparatus for load step mitigation is presented. In a described method and apparatus, a load step is mitigated on the condition that the energy consumption of one or more processor cores is less than an energy consumption threshold and that the number of processor cores that are capable of creating a load step is greater than a threshold defining a number of cores.

In some embodiments of the method and apparatus, the number of processor cores that are capable of creating a load step is determined by whether a core's Advanced Configuration and Power Interface (ACPI) performance state is higher performance-wise than a threshold defining an ACPI performance state. Further, the core's energy consumption is received from a core-side power monitor.

In yet other embodiment of the method and apparatus, load steps are mitigated if load step mitigation enabled. Further, to mitigate load steps a load step mitigation notification to one or more processor cores. Furthermore, the energy consumption threshold is a system-wide threshold in some embodiments.

BRIEF DESCRIPTION OF THE DRAWINGS

A more detailed understanding may be had from the following description, given by way of example in conjunction with the accompanying drawings wherein.

DETAILED DESCRIPTION

Figure 2:
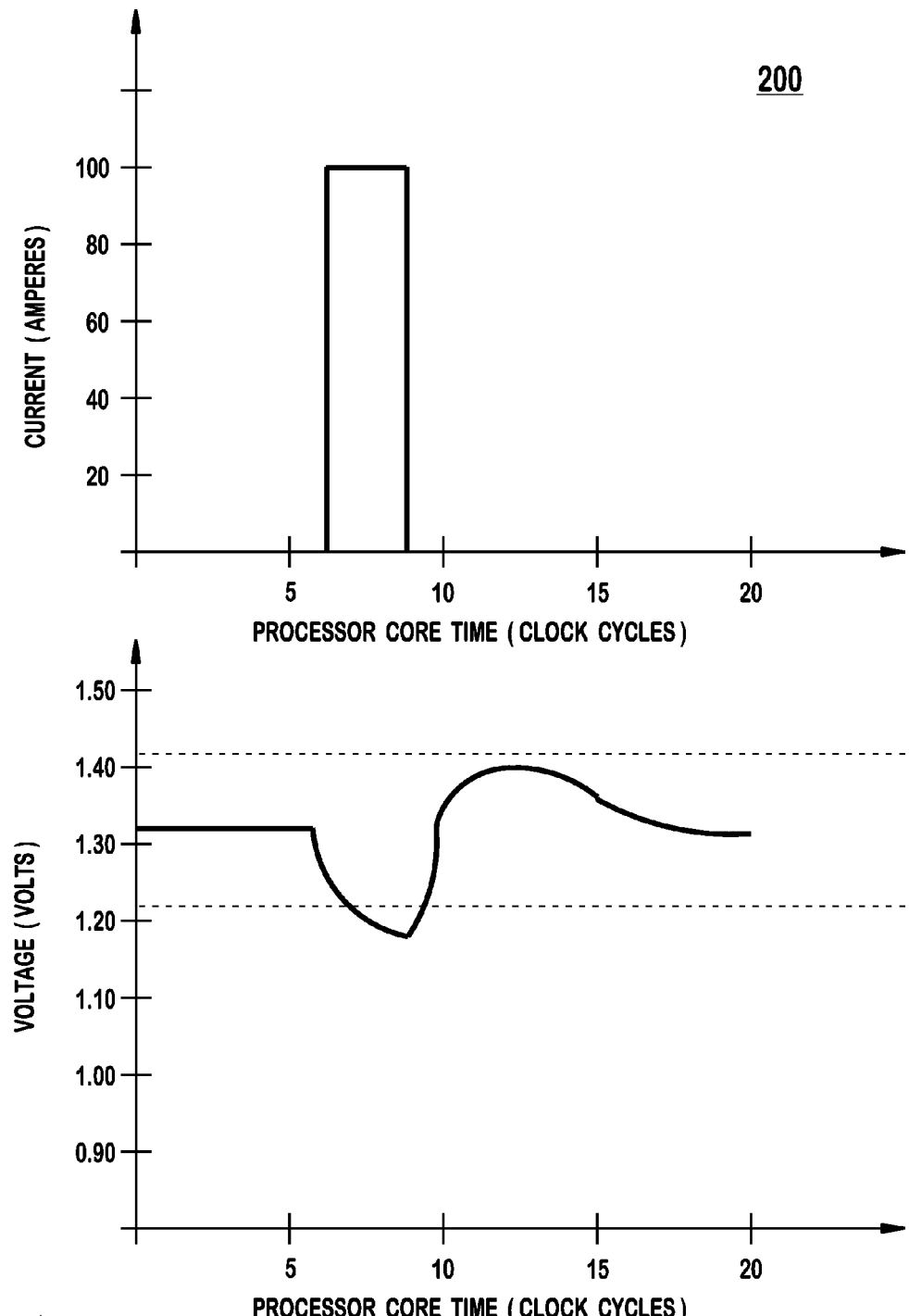
FIG. 2 shows an instance of a di/dt spike and its corresponding on voltage supply.

Given the nature of di/dt spikes, a processor core 115A-D, 125A-D that is lightly loaded in terms of the execution of code and the running of applications is more likely to cause a di/dt spike than a core that is heavily loaded. This is true because a lightly loaded core has more potential to suddenly draw more current if it were to be instantly required to perform computations than a moderately or heavily loaded core. As known by those skilled in the art, operations in a processor core 115A-D, 125A-D are performed by circuitry comprising transistors and logic gates that require supply of current for their operation. A lightly loaded processor core 115A-D, 125A-D may not be heavily executing instructions, and therefore may not be drawing a lot of current or power. However, lightly loaded cores have the capability to become heavily loaded and may draw a large amount of current for their circuitry (e.g. transistors) to execute, for instance, newly assigned operations. This jump in activity and requirement of current over a short period of time triggers voltage droops similar to the one pictured in FIG. 2.

Further, because processors have differing levels of operating frequency, a processor core 115A-D, 125A-D that is running at a higher frequency than a counterpart core is more likely to produce a more severe di/dt spike because the higher frequency core executes instructions faster and therefore draws current faster than its counterpart.

In one embodiment of the present invention, a di/dt mitigation throttle is triggered when a computer system, such as computer system 100, is at risk of a di/dt spike. The triggering of the throttle informs the processor cores, e.g. processor cores 115A-D, 125A-D, to seek to mitigate load steps, and processor cores may engage in any one of a variety of mechanisms to mitigate the load step. For example, a processor core may slow the execution of instructions or may disable the execution of instructions altogether. A processor core may also control the rate of execution of instructions that require higher power for execution, such as these that involve floating point or integer arithmetic operations.

The throttle is enabled in the described embodiments when two general conditions are met: there are a certain number of cores in a high frequency state in the computer system and these cores are in a relatively low activity workload such that there is a potential for a sustained voltage droop should the workload increase to higher activity. As for the first condition, high frequency cores are capable of generating more severe di/dt spikes than their low frequency counterparts and the more cores there are in a high frequency state, the more severe is the effect of the generated spikes on the computer system. For instance, a computer system having three cores in a high frequency state will be more likely to experience significant voltage droops than a computer system having only one core in a high frequency state because a jump in activity and instant need for current by the three cores will be compounded to produce a more significant voltage droop.

The load step mitigation throttle may not be engaged based on the first condition alone because doing will hinder the computer system's performance. As the operation of the computer system will be negatively affected if it were to engage in load step mitigation whenever a specified number of cores are in a high frequency state.

The second condition insures that load step mitigation is only performed when the cores are in a low activity workload. That is because high frequency cores that are low in activity are more likely to generate severe di/dt spikes than their counterparts that are in high activity. A low activity core's jump in activity will likely result in a more need for current and therefore a larger di/dt spike. Further, this condition requires that load step mitigation is not applied so liberally as to affect a computer system's performance.

In an embodiment of the present invention, for the purposes of load step mitigation, the Advanced Configuration and Power Interface (ACPI) state of a core is used to determine a core's frequency level that is used for the first condition. On the other hand, a core's activity level used in the second condition is determined from the level of power consumption of a processor core as reported by a processor core power monitor (PM).

Figure 1:
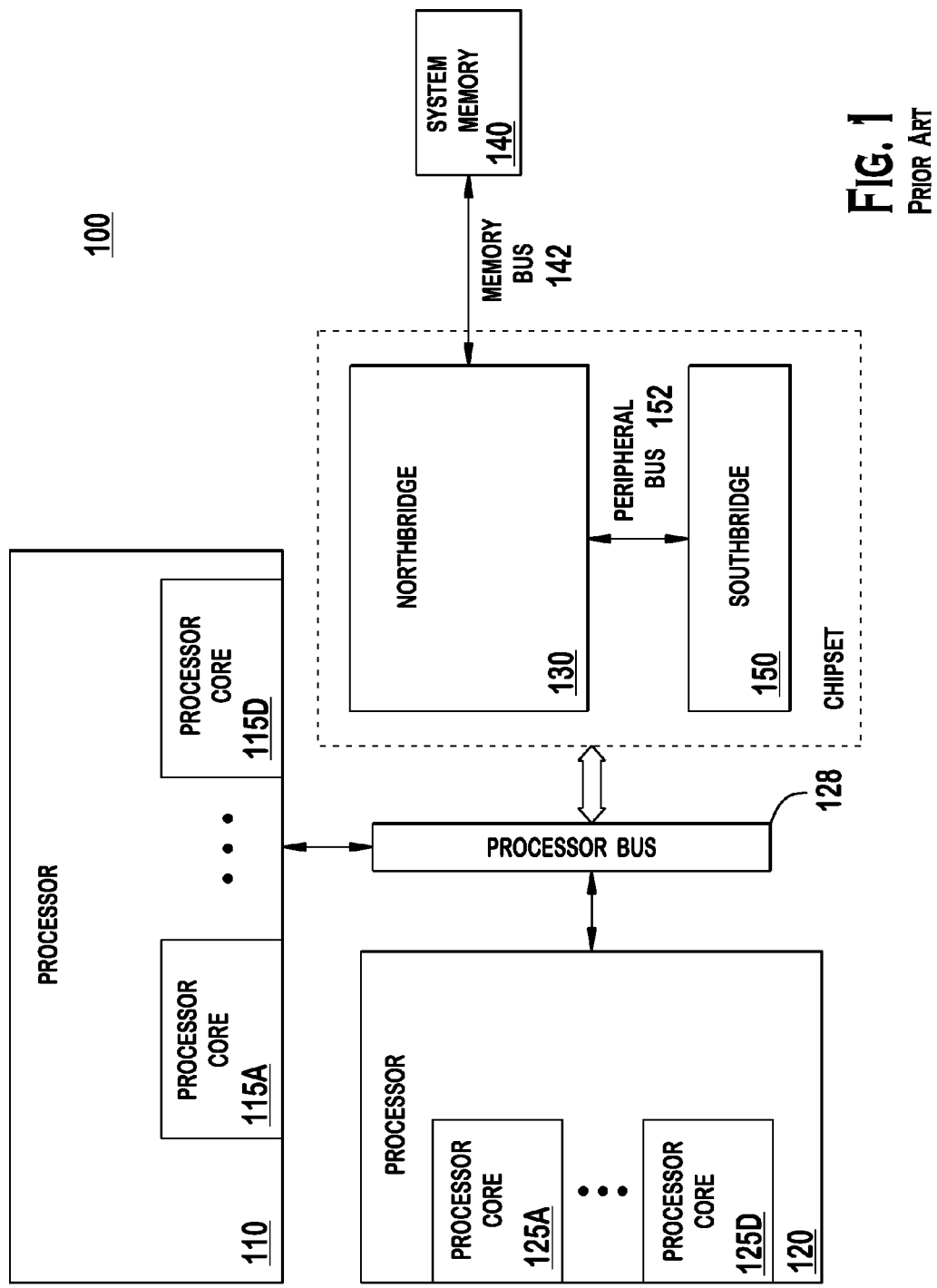
FIG. 1 shows an embodiment of a computer system.

Some computer systems, such as the computer system 100 of FIG. 1, utilize the ACPI standard for power management and monitoring. While the ACPI specification does not itself address the mitigation of di/dt spikes, or load steps as the problem will also be referred to herein, the ACPI will be used herein as part of the discussion of how to mitigate the load step problem.

The ACPI standard is an operating system-based specification that is targeted to regulate a computer system's power management. For instance, the ACPI standard may control and direct the processor cores for better management of battery life. In doing so, ACPI assigns processor power states, referred to as C-states, and forces a processor to operate within the limits of these states. There are varying levels of C-states that a processor may be assigned as shown in Table 1, along with the corresponding implication for a processor's performance.

TABLE 1

An instance of a processor C-states

| C-state (power state) | Implication |
| --- | --- |
| C0 | Fully working state, full power consumption, full dissipation of energy. |
| C1 | Sleeping state, stop the execution of instructions, may return to execution of instructions instantaneously |
| C2 | Sleeping state, may take longer to go back to C0 state |

While a processor is in the fully working C0 power state, it will be associated with another ACPI state, referred to as the performance state or the P-state. There are varying levels of P-states that are each associated with an operating voltage and frequency. The highest performance state is P0, which may correspond to maximum operating power, voltage, and frequency. However, a processor may be placed in lower performance states, such as P1 or P2, that correspond to lower operating power, voltage or frequency. Generally, when a processor moves to a lower performance (higher numerical) P-state it will operate at a lower capacity than before, and vice-versa. Table 2 shows an instance of the P-states that a processor in the C0 power state may attain, along with the corresponding implications.

TABLE 2

An instance of a processor P-states

| P-state (performance state) | Implication |
| --- | --- |
| P0 | Maximum operating power, voltage and frequency |
| P1 | Less operating power, voltage and frequency than P0 state |
| P2 | Less operating power, voltage and frequency than P1 state |

Figure 3:
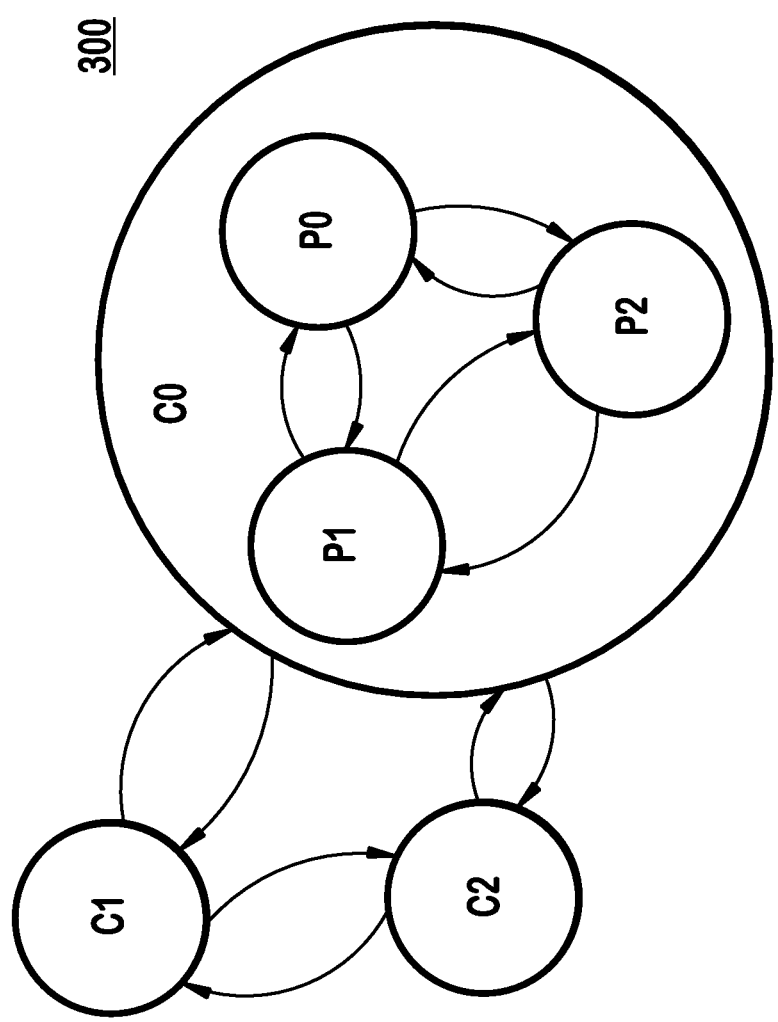
FIG. 3 shows an embodiment of entering and exiting various ACPI states.

FIG. 3 shows an embodiment of the ACPI power states (C-states) and performance states (P-states) and the manner in which a processor may enter or exit these states at the direction of the operating system. Although only three C-states and three P-states are shown in FIG. 3, the ACPI standard may specify more than a maximum of three states, and a particular processor's implementation may define the operation according to more than three C-states or P-states.

For illustration purposes, Table 3 shows the power specifications for one type of AMD Phenom™ processor based on its ACPI C-states and P-states.

TABLE 3

AMD Phenom ™ Processor HDX920XCJ4DGI Power Specification

| State | Specification | Single-Plane Specification |
| --- | --- | --- |
| C0.P0 | CPU Current Operating Frequency | 2800 MHz |
| | Total Power Dissipation | 140.8 W |
| | Voltage Minimum | 1.225 V |
| | Voltage Maximum | 1.425 V |
| | Current Maximum | 102.5 A |
| C0.P1 | CPU Current Operating Frequency | 2100 MHz |
| | Total Power Dissipation | 94.7 W |
| | Voltage Minimum | 1.150 V |
| | Voltage Maximum | 1.325 V |
| | Current Maximum | 77.6 A |
| C0.P2 | CPU Current Operating Frequency | 1600 MHz |
| | Total Power Dissipation | 88.7 W |
| | Voltage Minimum | 1.150 V |
| | Voltage Maximum | 1.225 V |
| | Current Maximum | 72.4 A |
| C0.P3 | CPU Current Operating Frequency | 800 MHz |
| | Total Power Dissipation | 79.2 W |
| | Voltage Minimum | 1.150 V |
| | Voltage Maximum | 1.150 V |
| | Current Maximum | 64.1 A |

Accordingly, a processor that is placed by the ACPI in the C0.P0 state has the potential to generate a load-step, or a di/dt spike, of a greater magnitude than a processor that is in a P1, P2, or P3 state, particularly if it is lightly loaded (i.e. not very busy executing operations). If the workload of the processor in P0 state increases from a low activity level to a high activity level, the processor and its cores may operate at a higher frequency, dissipate more power and draw more current than if it was in any one of the remaining states. Similarly, a processor core in the C0.P1 state has a greater potential of generating a di/dt spike or a load step than a counterpart processor core in the P2 or P3 state, assuming the two processors currently have the same workloads. The degree to which a processor core is operating below maximum frequency, meaning at a lower performance (higher numerical) P-state than P0 state, has a multiplied effect on the potential load step exposure of the core, since it linearly reduces both di and dt. As seen in Table 3, when the processor moves from C0.P0 to C0.P1 operating frequency, power dissipation, operating voltage and current consumption are all reduced. Accordingly, if a core is operating at a performance state that is 20% below maximum frequency, the core's di/dt exposure may be 40% below its maximum possible di/dt exposure.

Figure 4:
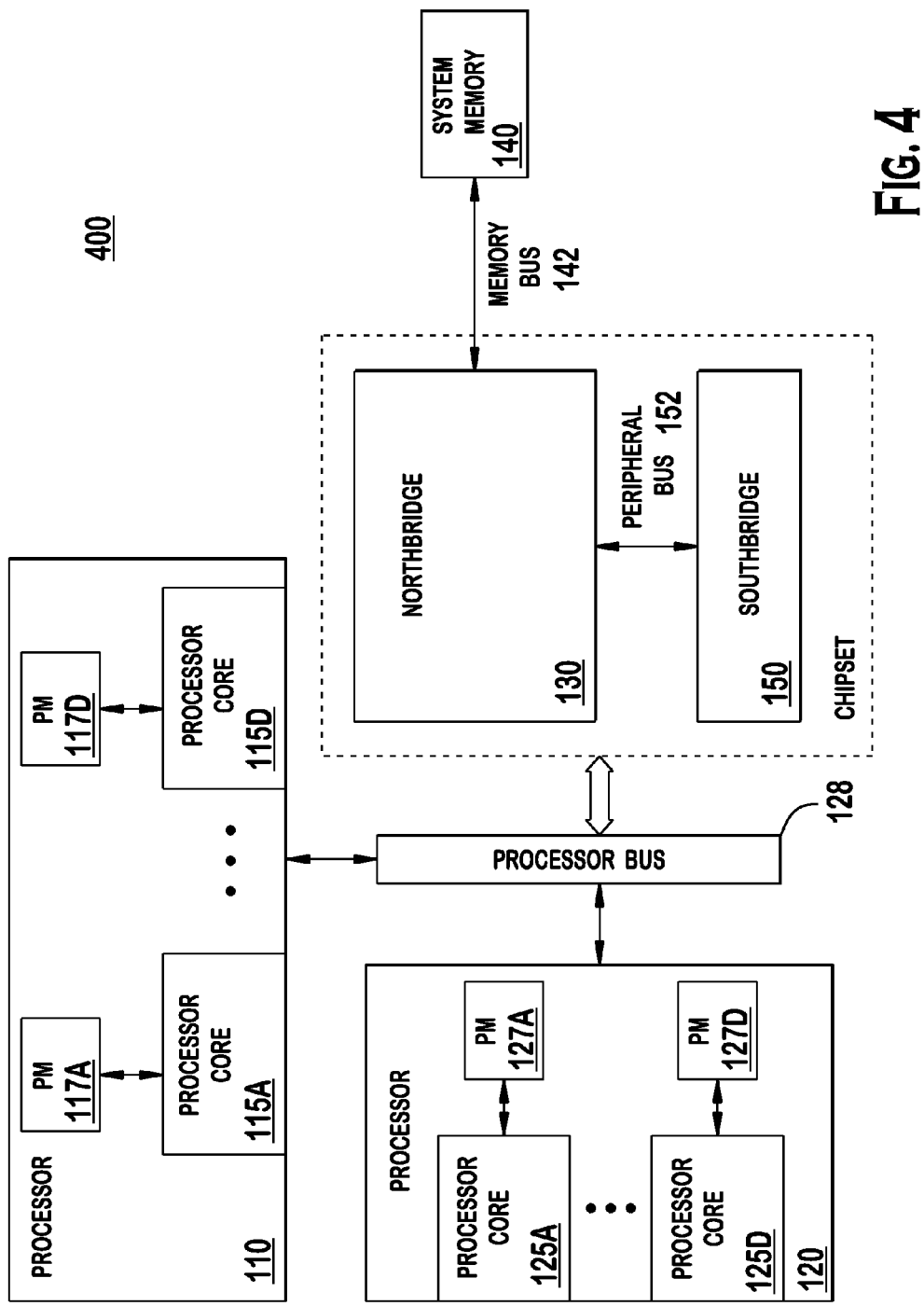
FIG. 4 shows an embodiment of a computer system.

A processor core's workload, in addition to its P-state, provides further insight into the core's potential for load step exposure. A power monitor reporting the power consumption of processor cores is utilized to reveal the workload associated with these cores. FIG. 4 shows an embodiment of computer system 400. Computer system 400 has two processors 110, 120, but any other number of processors is in-line with the embodiments discussed herein. Additionally, the processors 110, 120 of computer system 400 each have one or more processor cores 115A-D, 125A-D that are responsible for code execution and the running of computer applications. Each of the processor cores 115A-D, 125A-D has a power monitor (PM) 117A-D, 127A-D that is responsible for reporting an energy count that represents the power consumed by the core. For instance the power monitor may report an 8-bit number (0 to 255) to represent the power consumption by the core, where 0 represents zero power consumed and 255 represents maximum power consumed. A power monitor may be implemented by sampling the energy consumption of each core at a specified time interval (for instance, at every 10 nanoseconds (ns)) and subsequent multiplication by a factor to result in an energy count between the range of 0 to 255. Those skilled in the art will recognize that the power monitor may be on-chip with the core or function as an off-chip power monitor.

The energy count, as reported by the power monitors 117A-D, 127A-D, may be used to reveal the level of workload at which a processor core 115A-D, 125A-D is performing. For instance, an energy count of 100 (on a scale of 0 to 255) may imply that a core is lightly used or lightly loaded. Conversely, an energy count of 250 may imply that a core is heavily loaded. Therefore, if the ACPI state is the same for two cores, the core with a lower energy count is likely to experience a di/dt spike of a higher magnitude than the core with a higher energy count. Additionally, load step problems are more likely to arise when a computer system (for example, a System-on-a-chip (SOC)) is lightly loaded, as a whole. The total load step exposure of a computer system is the difference between the sum of the maximum energy counts of all the processor cores and the sum of the actual energy counts of all the processor cores, since this is the possible jump in workload that the computer system could experience. Accordingly, when the sum of the energy counts of all system processor cores is low, then the system is relatively lightly loaded and a load step problem is likely to result if there is a jump in activity.

In one embodiment of a computer system, like computer system 400, the energy count of the processor cores 115A-D, 125A-D reported by the power monitors 117A-D, 127A-D is used in combination with knowledge of the ACPI states of the processors 110, 120 to mitigate the occurrence of load steps and di/dt spikes. In this embodiment, a throttle is triggered when it is determined that there is a risk of a load step or a di/dt spike.

Two conditions are required to be met for the throttle enabling load step mitigation to be triggered:

Condition 1: The sum of the energy counts of all system processor cores is less than an energy count threshold, which is also referred to herein as LdStepThreshold. That is, the sum of the reported energy counts of all the processor cores is less than the threshold below which load step problems are likely to arise. When this condition is satisfied, it is implied that the computer system as a whole is lightly loaded.

Condition 2: The number of processor cores that are at a higher performance state (lower numerical P-state) than a threshold P-state, also referred to as LdStepPstate, exceeds the number of processor cores that are at a lower performance state (higher numerical P-state) than the LdStepPstate. When satisfied, this condition implies that there are more cores operating at a performance state with a high potential for generating a di/dt spike than cores operating at a performance state with low potential for generating a di/dt spike.

Requiring the fulfillment of these conditions before the load step mitigation throttle is engaged ensures that load step mitigation is only employed when di/dt spikes are most likely to occur and thus any performance degradation that may be encountered by enabling the load step mitigation throttle is minimized. As discussed herein, di/dt spikes are more likely to occur when a computer system is lightly loaded (accounted for by condition 1) and when the majority of cores are in high performance (low numerical) P-states (accounted for by condition 2). The combination of these conditions ensures that load step mitigation is only employed when necessary and that the execution of applications by the processor cores is not negatively affected. It is common in computer systems that fewer than the maximum number of cores are busy executing instructions. Further, it is common that some of the cores in a computer system will be in lower power (higher numerical) C-states or lower performance (higher numerical) P-states. Therefore, requiring fulfillment of the conditions discussed herein before employing the load step mitigation throttle ensures that di/dt spikes are mitigated while minimizing potential performance impacts from engaging in load step mitigation.

The variables LdStepPstate and LdStepThreshold may be determined by calculating the maximum possible di/dt spike or load step exposure (which may be done by simulating worst case conditions) for the computer system as a whole with the throttle enabled. Then LdStepPstate and LdStepThreshold may be set so that the throttle will be disabled in conditions where overall load step exposure is less than the maximum possible exposure with the throttle enabled. For instance, if a computer system is operating under worst case conditions for possible di/dt exposure (i.e., all processor cores are operating and are in C0.P0 state and have energy counts of zero), the enabling of the throttle may, for example, reduce overall load step exposure by 70% (meaning that total possible di/dt exposure is 30% of maximum possible exposure). In this case, LdStepPstate and LdStepThreshold will be set so that the throttle will be disabled, pursuant to the method described herein, in any situation where total possible di/dt exposure without enabling the throttle is less than 30% of the maximum possible di/dt exposure. LdStepPstate and LsStepThreshold will be set accordingly, based on the effects that processor core performance states and energy counts have on load step exposure, as discussed herein.

For instance, if di/dt mitigation reduces exposure to di/dt by 50% in worst case conditions. Then, when 50% or more of the cores are inactive in a computer system, di/dt mitigation may be disabled because with more than 50% of the cores inactive, the maximum di/dt exposure is reduced by that percentage. Similarly, when the cores are at more than 50% of their maximum energy consumption level, then di/dt mitigation may be disabled. Also when the P-states of the cores are in a state such that their di/dt exposure is less than 50% of the maximum, then di/dt mitigation may be disabled. These parameters can be combined together to determine whether to enable di/dt mitigation.

In an embodiment of the present invention, in order to determine when to engage or enable the load step throttle, several variables are tracked and compared. These variables are:

V1) LdStepThrEn: determines whether the load step mitigation throttle is enabled. For instance if the value of this variable is 1, it may indicate that the throttle is enabled. However, if the value is 0, it may indicate that the throttle is undesirable, or "turned off."

V2) LdStepPstate: specifies a P-state (0, 1, 2, etc.) which will be used in determining when to engage the load step throttle.

V3) LdStepNumCores: tracks the number of processor cores operating at a P-state that is a lower performance state (higher numerically) than LdStepPstate.

V4) LdStepThreshold: specifies a threshold for the sum of the energy counts of all processor cores, below which load step problems are likely to arise.

The di/dt or load step mitigation throttle is enabled if all of the following three conditions are met:

A) LdStepThrEn indicates that the throttle is enabled.

B) The sum of the energy counts of all system processor cores is less LdStepThreshold.

C) The number of processor cores operating at a P-state that is a higher performance state (lower numerically) than LdStepPstate is greater than LdStepNumCores. Equivalent to condition 2.

Load step mitigation may be enabled when conditions A, B and C are all met.

Figure 5:
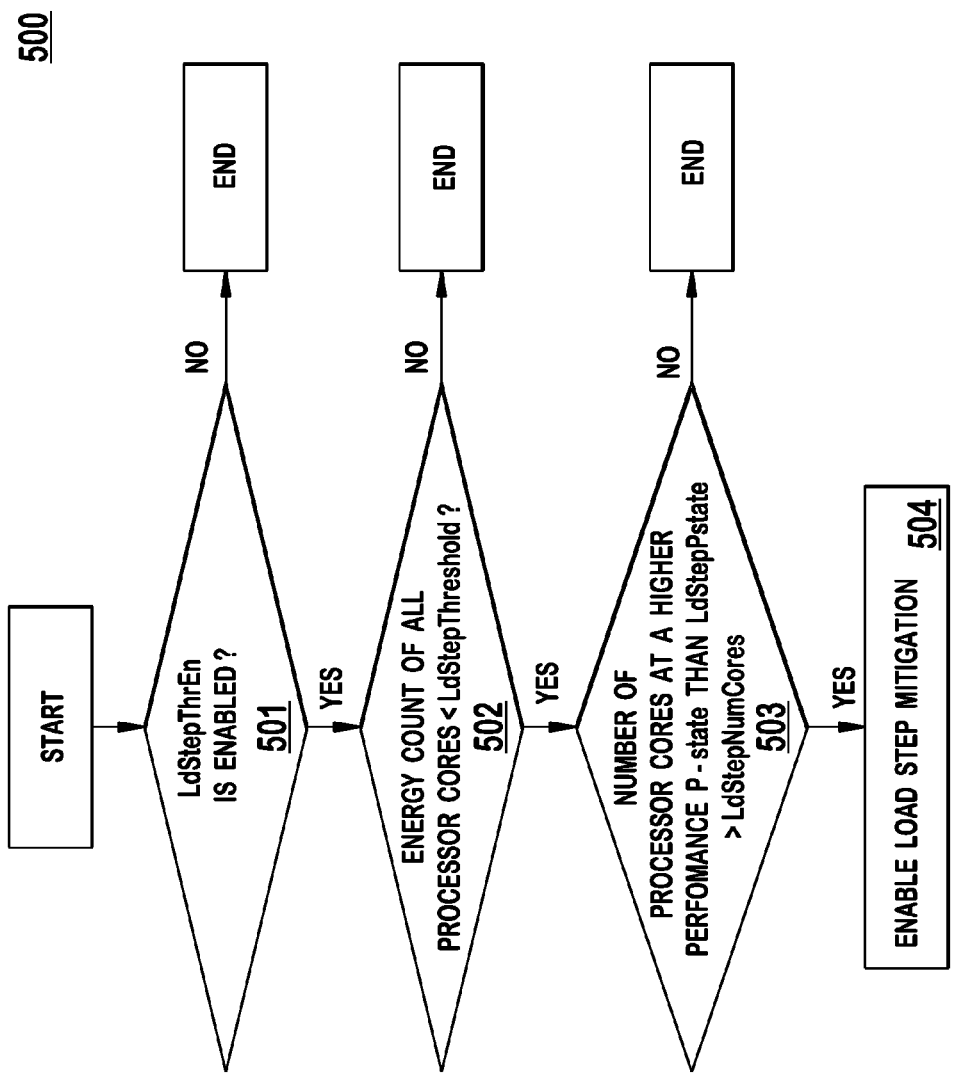
FIG. 5 shows a flow diagram of a method for load step mitigation.

FIG. 5 shows a flow diagram of the load step mitigation method in accordance with an embodiment of the present disclosure. It is first determined 501 whether LdStepThrEn is enabled. If it is not enabled, then the procedure is ended and the load step mitigation throttle is not enabled. If it is enabled, then it is determined 502 if the sum of the energy counts of all processor cores is less than the LdStepThreshold. If this condition is not satisfied, then the procedure is ended. If it is satisfied, then it is determined 503 whether the number of processor cores at a higher performance (lower numerical) P-state than the LdStepPstate is greater than the LdStepNumCores. If this condition is satisfied, then the load step mitigation throttle is enabled 504.

In another embodiment of this invention, registers are maintained that contain the values of the variables discussed herein. For instance, Table 4 shows an embodiment of four registers and their corresponding bit sizes that will hold the values of the variables.

TABLE 4

Register values of the variables

| Register | Size (bits) | Description |
| --- | --- | --- |
| LdStepThrEn | 1 | 1 = enabled, 0 = disabled |
| LdStepPstate | 3 | The specified P-state for determining when to engage di/dt mitigation |
| LdStepNumCores | 4 | The number of cores operating at a lower performance (higher numerical) P-state than LdStepPstate |
| LdStepThreshold | 16 | Threshold for the sum of the energy counts of all processor cores, below which load step problems are likely to arise |

Figure 6:
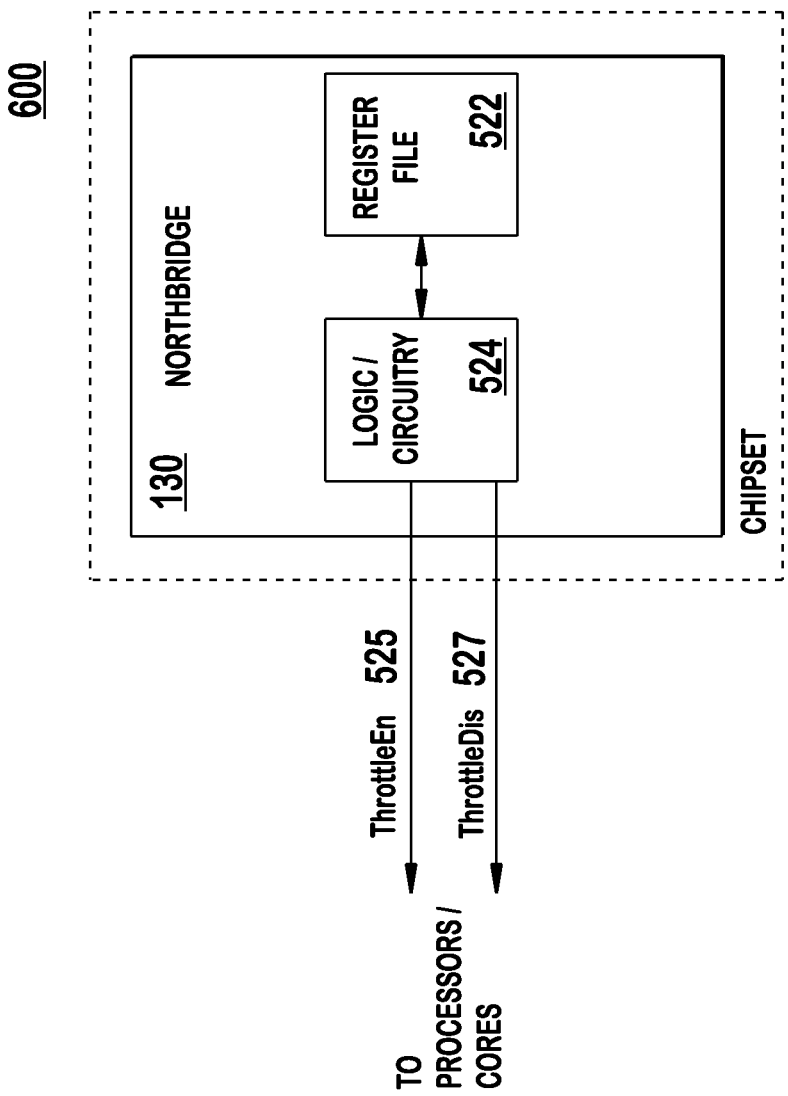
FIG. 6 shows an example of a Northbridge device with a register file and logic/circuitry.

FIG. 6 shows a register file 522 in the Northbridge 130. The register file 522, which houses registers, is connected to logic/circuitry 524 that will employ the method detailed in FIG. 5 to determine whether to enable the load step mitigation throttle. If the load step mitigation throttle is to be enabled, based on the method from FIG. 5, the processors and their cores are signaled via ThrottleEn 525 signal. Alternatively, if any of the required conditions from the method detailed in FIG. 5 are not met, a ThrottleDis 527 signal is signaled to the processors and their cores to disable the load step mitigation throttle. As mentioned herein, when the load step throttle is enabled and the processor cores are instructed to mitigate load steps, processor cores may employ a variety of mitigation techniques such as slowing down or ceasing the execution of commands.

Although features and elements are described above in particular combinations, each feature or element may be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of processors, one or more processors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions (such instructions capable of being stored on a computer readable media). The results of such processing may be maskworks that are then used in a semiconductor manufacturing process to manufacture a processor which implements aspects of the present invention.

What is claimed is:

1. A method for load step mitigation for a multi-core processor, the method comprising:
    mitigating a load step on the condition that an energy consumption of one or more high frequency processor cores is less than an energy consumption threshold and that the number of high frequency processor cores that are capable of creating the load step is greater than a threshold defining a number of cores.

2. The method of claim 1, wherein the number of processor cores that are capable of creating a load step is determined based on whether an Advanced Configuration and Power Interface (ACPI) performance state associated with a core is higher, performance-wise, than a threshold defining the ACPI performance state.

3. The method of claim 1, wherein the energy consumption of the one or more processor cores is received from a core-side power monitor.

4. The method of claim 1, wherein the load step is mitigated on a condition that load step mitigation is enabled.

5. The method of claim 1, further comprising:
    sending a load step mitigation notification to the one or more processor cores.

6. The method of claim 1, wherein the energy consumption threshold is a system-wide threshold.

7. An apparatus comprising:
    circuitry configured to mitigate a load step on the condition that an energy consumption of one or more high frequency processor cores is less than an energy consumption threshold and that the number of high frequency processor cores that are capable of creating the load step is greater than a threshold defining a number of cores.

8. The apparatus of claim 7, wherein the number of processor cores that are capable of creating a load step is determined by whether an Advanced Configuration and Power Interface (ACPI) performance state associated with a core is higher, performance-wise, than a threshold defining the ACPI performance state.

9. The apparatus of claim 7, wherein the energy consumption of the one or more processor cores is received from a core-side power monitor.

10. The apparatus of claim 7, wherein the load step is mitigated on the condition that load step mitigation is enabled.

11. The apparatus of claim 7, further comprising:
    the circuitry configured to send a load step mitigation notification to the one or more processor cores.

12. The apparatus of claim 7, wherein the energy consumption threshold is a system-wide threshold.

13. The apparatus of claim 7, further comprising:
    memory coupled to the circuitry via a memory bus.

14. A non-transitory computer-readable storage medium storing a set of instructions for execution by a general purpose computer for load step mitigation, the set of instructions comprising:
   a mitigating code segment for mitigating a load step on the condition that an energy consumption of one or more high frequency processor cores is less than an energy consumption threshold and that the number of high frequency processor cores that are capable of creating the load step is greater than a threshold defining a number of cores.

15. The non-transitory computer-readable storage medium of claim 14, wherein the set of instructions are hardware description language (HDL) instructions used for the manufacture of a device.

16. The non-transitory computer-readable storage medium of claim 14, wherein the number of processor cores that are capable of creating a load step is determined based on whether an Advanced Configuration and Power Interface (ACPI) performance state associated with a core is higher performance-wise than a threshold defining the ACPI performance state.

17. The non-transitory computer-readable storage medium of claim 14, wherein the energy consumption of the one or more processor cores is received from a core-side power monitor.

18. The non-transitory computer-readable storage medium of claim 14, wherein the load step is mitigated on the condition that load step mitigation is enabled.

19. The non-transitory computer-readable storage medium of claim 14 further comprising:
   a sending code segment for sending a load step mitigation notification to the one or more processor cores.

20. The non-transitory computer-readable storage medium of claim 14, wherein the energy consumption threshold is a system-wide threshold.

* * * * *